US009477435B2

(12) United States Patent
Nishiyama et al.

(10) Patent No.: US 9,477,435 B2
(45) Date of Patent: Oct. 25, 2016

(54) IMAGE PROCESSING APPARATUS, INFORMATION TERMINAL, AND PROGRAM

(71) Applicant: CANON KABUSHIKI KAISHA, Tokyo (JP)

(72) Inventors: Kaori Nishiyama, Tokyo (JP); Nobuaki Fukasawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/686,609

(22) Filed: Apr. 14, 2015

(65) Prior Publication Data

US 2015/0301768 A1    Oct. 22, 2015

(30) Foreign Application Priority Data

Apr. 18, 2014 (JP) ................................ 2014-086607

(51) Int. Cl.
G06F 3/12 (2006.01)

(52) U.S. Cl.
CPC ........... *G06F 3/1285* (2013.01); *G06F 3/1205* (2013.01); *G06F 3/1257* (2013.01); *G06F 3/1258* (2013.01); *G06F 3/1292* (2013.01)

(58) Field of Classification Search
CPC .. G06F 3/1285; G06F 3/1205; G06F 3/1257; G06F 3/1258; G06F 3/1292
USPC ........................................................ 358/1.15
See application file for complete search history.

(56) References Cited

U.S. PATENT DOCUMENTS

| 7,698,471 | B2 * | 4/2010 | Aoki ..................... G06F 3/1204 358/1.15 |
| 8,120,792 | B2 * | 2/2012 | Moro ..................... G06K 15/00 358/1.13 |
| 8,166,489 | B2 * | 4/2012 | Kimoto .............. H04N 1/00233 719/321 |
| 2010/0321731 | A1 * | 12/2010 | Yasui ..................... G03G 15/50 358/1.15 |
| 2012/0081731 | A1 * | 4/2012 | Suzuki .................. G06F 3/1205 358/1.13 |

FOREIGN PATENT DOCUMENTS

JP    2010-114825 A    5/2010

* cited by examiner

*Primary Examiner* — Allen H Nguyen
(74) *Attorney, Agent, or Firm* — Canon U.S.A., Inc. IP Division

(57) ABSTRACT

If a control method during correction processing is not designated in setting information sent from a mobile terminal and if the image forming apparatus has no capability to execute a function (element) designated in the setting information, the image forming apparatus corrects the setting information to be a setting corresponding to the capability. On the other hand, if the control method during the correction processing is designated in the setting information sent from the mobile terminal and if the image forming apparatus has no capability to execute a function (element) designated in the setting information, the image forming apparatus performs correction after confirmation of stop of the function or correction of the function according to the control method.

8 Claims, 19 Drawing Sheets

FIG. 6A

```
600
  <setting"data>                                                              — 601
  <function>send</function>                                                   — 602
  <address><to>ginji@xxx.co.jp</to><to></address>                             — 603
     <to>goemon@xxx.co.jp</to><to>buntaro@xxx.co.jp</to>                      — 604
  <format>xps</format>                                                        — 605
  <resolution>300</resolution>                                                — 606
  <twoSideOriginal>true</twoSideOriginal>                                     — 607
  <start>true</start>
  ......
  </setting"data>                                                             — 608
```

FIG. 6B

```
<setting"data>
<function>box</function>
<boxfunction>moveScanFolder</boxfunction>
<folder>¥folder12¥document¥</format>
......
</setting"data>
```

610

611 <setting"data>
612 <function>box</function>
613 <boxfunction>moveScanFolder</boxfunction>
614 <folder>¥folder12¥document¥</format>
615 </setting"data>

FIG. 6C

```
<setting "data>                                           — 621
<function>box</function>                                  — 622
<boxfunction>scan</boxfunction>                           — 623
<folder>¥folder3¥DEPARTMENTAL PROCEEDINGS¥</format>      — 624
<twoSideOriginal>true</twoSideOriginal>                   — 625
......
</setting "data>                                          — 626
```

FIG. 6E

```
<setting"data>
<function>send</function>
<address><to>ginji@xxx.co.jp</to><to>buntaro@xxx.co.jp</to>
<to>goemon@xxx.co.jp</to></address>
<format>xps</format>
<format_rev>cancel</format_rev>
<resolution>300</resolution>
<resolution_rev>check</resolution_rev>
<twoSideOriginal>true</twoSideOriginal>
<start>true</start>
......
</setting"data>
```

640
641 <setting"data>
642 <function>send</function>
643 <address>...</address>
644 <format>xps</format>
649 <format_rev>cancel</format_rev>
645 <resolution>300</resolution>
650 <resolution_rev>check</resolution_rev>
646 <twoSideOriginal>true</twoSideOriginal>
647 <start>true</start>
648 </setting"data>

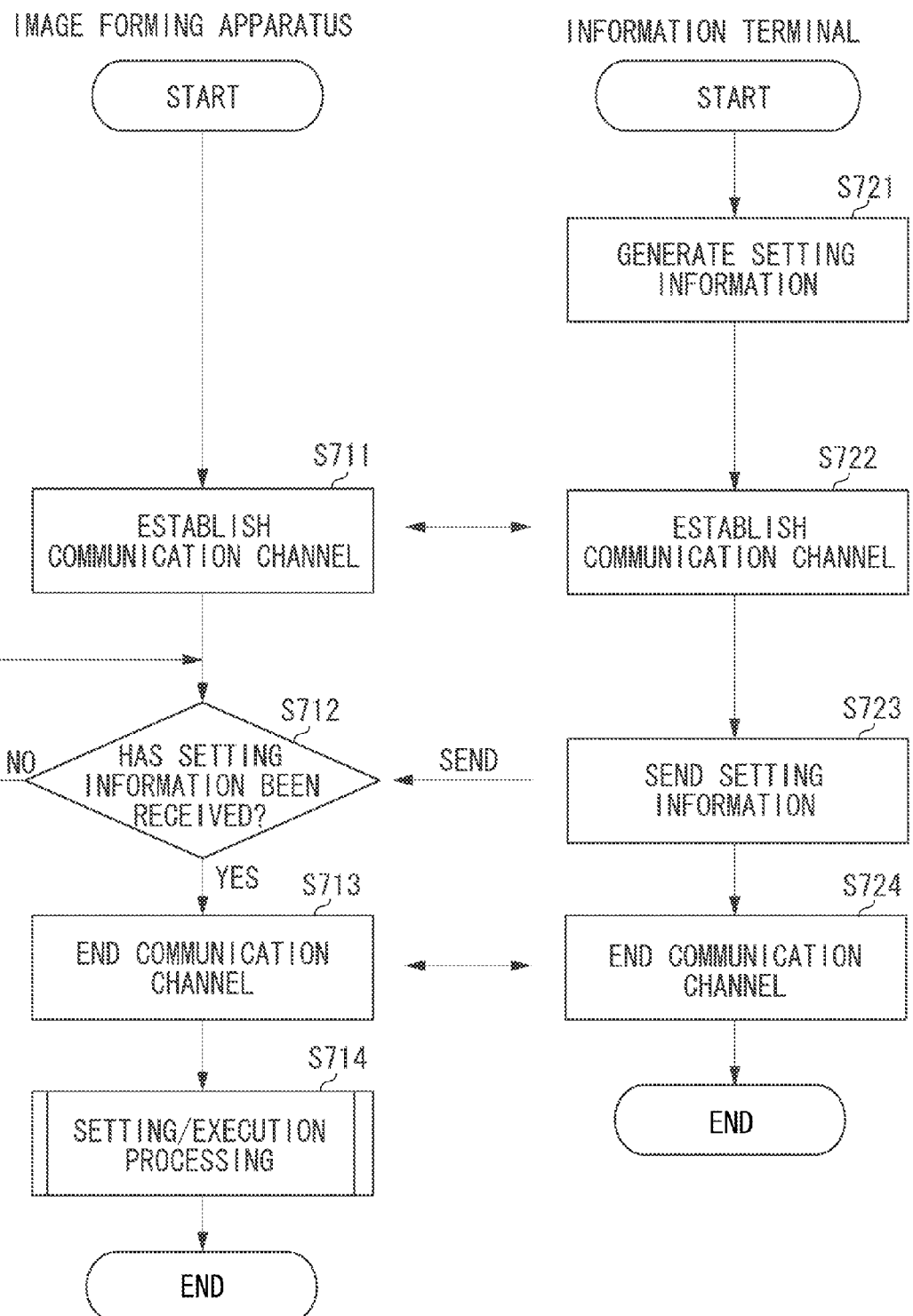

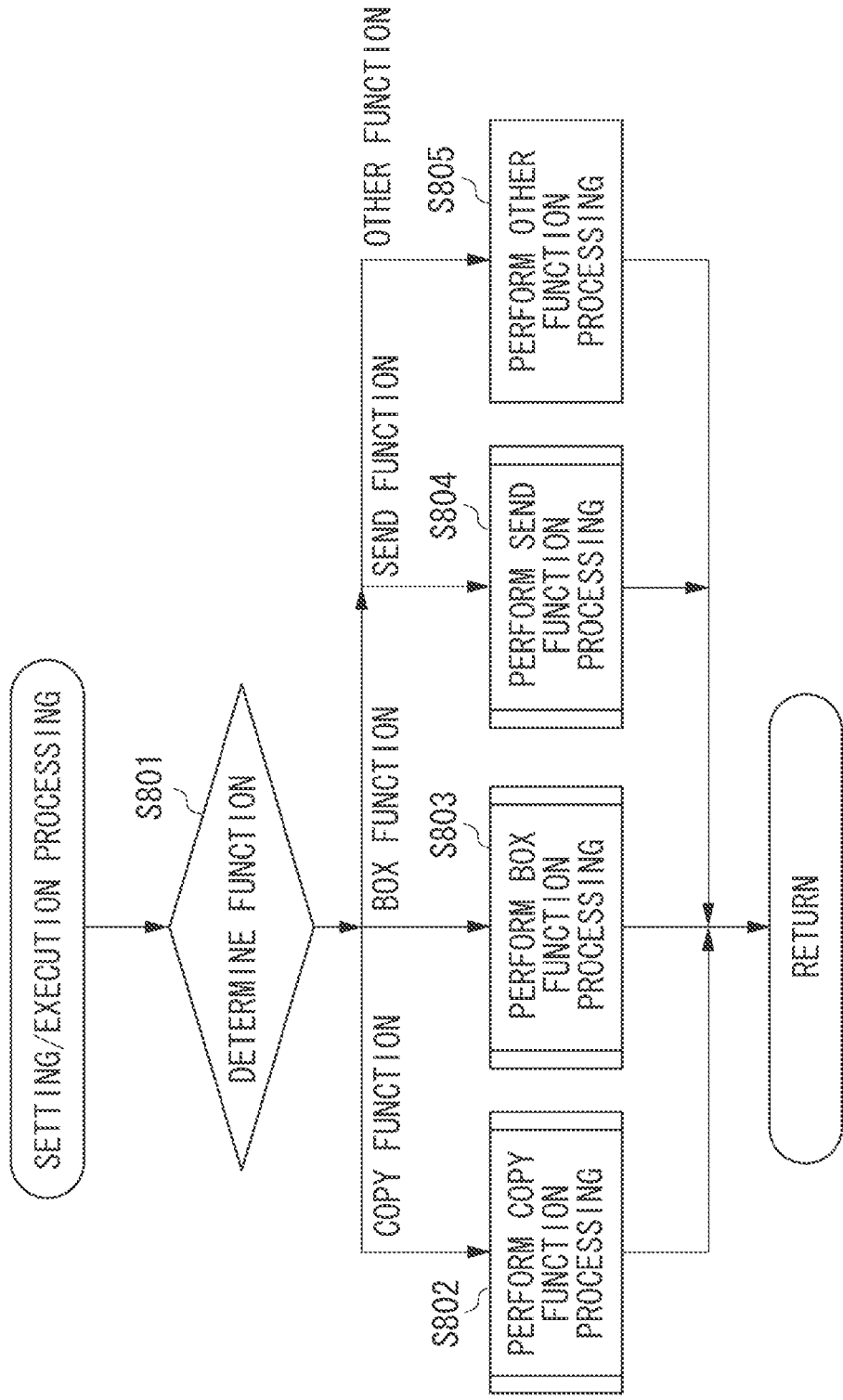

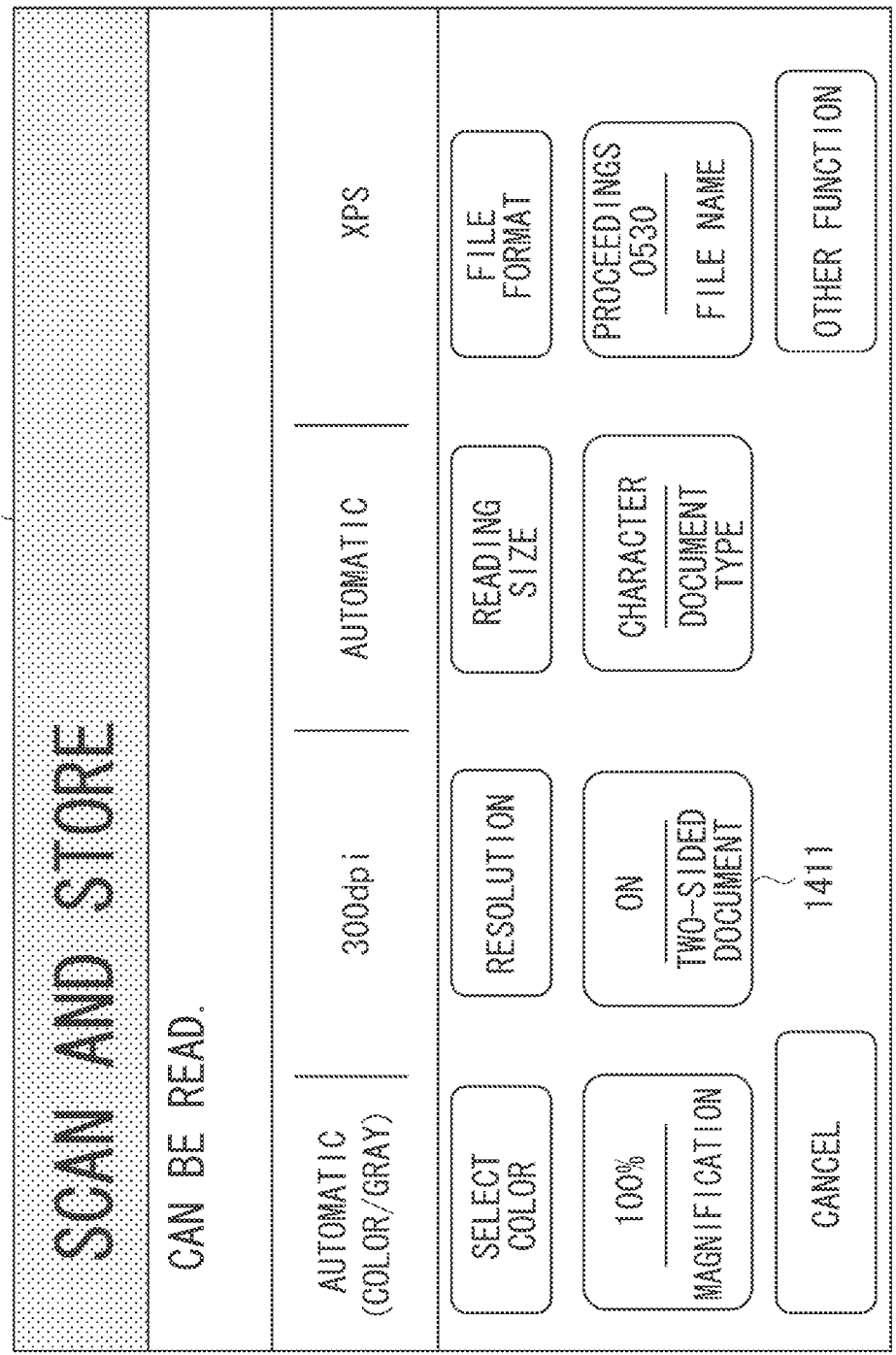

IMAGE PROCESSING APPARATUS, INFORMATION TERMINAL, AND PROGRAM

BACKGROUND OF THE INVENTION

1. Field of the Invention

The present invention relates to an image processing apparatus, an information terminal, and a program. More particularly, the present invention is appropriately used to operate the image processing apparatus in response to an instruction from the information terminal.

2. Description of the Related Art

Many image forming apparatuses have preset buttons. When a content of a setting is previously stored in the image forming apparatus, if it is called based on an operation of the preset button, the content (a function) of the setting can be used by simply making a setting for the image forming apparatus even if the stored setting is complicated. Convenience may be further enhanced when the contents of the setting are stored for each individual (see Japanese Patent Application Laid-Open No. 2010-114825). In the following description, such setting is referred to as presetting, as needed.

However, a content of the presetting needs to be previously set in each of the image forming apparatuses. Thus, the following problem occurs.

Even when the image forming apparatuses are of the same type, the presetting may not have been performed. In such a case, even if a normal operation for the preset image forming apparatus has been performed, a user cannot give an instruction to execute a function enabled by the presetting. More specifically, a content present in the image forming apparatus, which the user normally uses, is rarely set in an image forming apparatus which is installed on another floor or an image forming apparatus in another business office, for example. Further, the desired presetting is not performed for an image forming apparatus at a business trip destination. When using the image forming apparatus for which the desired presetting has not been performed, even if the image forming apparatus is used just as the image forming apparatus of the same type and having the same function, the user is forced to carry out an operation different from usual, which causes inconvenience.

SUMMARY OF THE INVENTION

The present invention is directed to enabling a user to operate an image processing apparatus for which presetting has not been performed, with an operation feeling that is as close as possible to an image processing apparatus for which presetting has been performed.

According to an aspect of the present invention, an image processing apparatus includes a reading unit configured to read an image on a document and generate image data, a sending unit configured to send the image data generated by the reading unit to the outside, a receiving unit configured to receive setting information representing a content of a setting which causes the sending unit to execute a send function, a determination unit configured to determine whether the send function can be executed by the setting represented in the setting information received by the receiving unit, a change unit configured to change, when the determination unit determines that the send function cannot be executed by the setting represented in the setting information, the setting represented in the setting information to a setting in which the image processing apparatus can execute the send function, and an execution unit configured to execute the send function by performing the setting based on the setting information, in which the execution unit executes, when the change unit has changed the setting information, the send function based on the changed setting information.

According to another aspect of the present invention, an information terminal includes an acquisition unit configured to acquire setting information representing a content of a setting required to execute a send function to send image data generated when an image processing apparatus reads an image on a document, to the outside, a storage unit configured to store the setting information acquired by the acquisition unit, and a sending unit configured to send at least one piece of setting information selected by a user from among the setting information stored by the storage unit, in which the sending unit sends the setting information without confirming whether the image processing apparatus can implement the setting represented in the setting information.

Further features of the present invention will become apparent from the following description of exemplary embodiments with reference to the attached drawings.

BRIEF DESCRIPTION OF THE DRAWINGS

FIG. 6A illustrates a first example of setting information.

FIG. 6B illustrates a second example of setting information.

FIG. 6C illustrates a third example of setting information.

FIG. 6E illustrates a fifth example of setting information.

FIG. 7 is a flowchart illustrating the outline of operations of an image forming apparatus and an information terminal.

FIG. 8 is a flowchart illustrating details of step S714.

FIGS. 14A and 14B illustrate first and second examples of a display screen of an information terminal.

DESCRIPTION OF THE EMBODIMENTS

An exemplary embodiment of the present invention will be described below with reference to the drawings.

Figure 1:
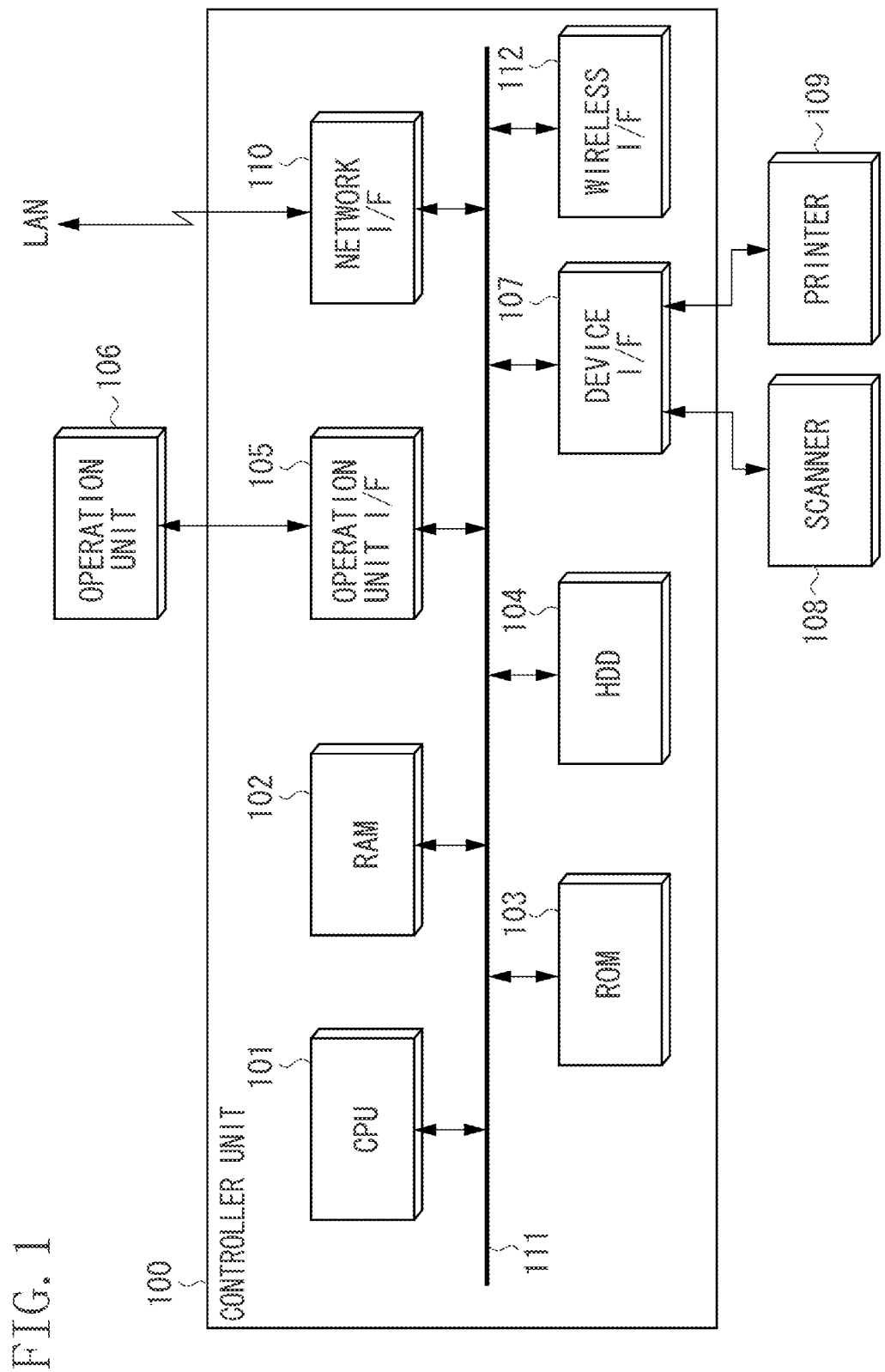
FIG. 1 illustrates a hardware configuration of an image forming apparatus.

FIG. 1 illustrates an example of a hardware configuration of an image forming apparatus.

In FIG. 1, a controller unit 100 is a device that controls the image forming apparatus. A central processing unit (CPU) 101 is a calculation device for controlling an entire system. The CPU 101, a random access memory (RAM) 102, a read-only memory (ROM) 103, a hard disk drive (HDD) 104, an operation unit interface (I/F) 105, a device I/F 107, a network I/F 110, and a wireless I/F 112 are connected to a system bus 111. The CPU 101 integrally controls the devices connected to the system bus 111.

The RAM 102 is a system work memory for the CPU 101 to operate, and is also an image memory for temporarily storing image data. The RAM 102 also temporarily stores (rasterizes) an operating system, programs such as system software and application software, and data.

The ROM 103 stores a system boot program. A system program and an application program may be stored in the ROM 103. Alternatively, information required for the image forming apparatus, for example, a font may be stored in the ROM 103. The HDD 104 is a hard disk drive, and stores the operating system, the system software and the application software, the image data, and setting data.

The CPU 101 executes the program which is rasterized onto the RAM 102, and processes data (image data, etc.) stored in the RAM 102, the ROM 103, and the HDD 104. A small-sized image forming apparatus may have a configuration (a hard diskless configuration) that stores the system software and the application software in the ROM 103 without being provided with the HDD 104. Alternatively, the HDD 104 may be replaced with a storage device other than a hard disk, such as a solid state disk (SSD) using a flash memory.

The controller unit 100 includes the operation unit I/F 105, the device I/F 107, the network I/F 110, and the wireless I/F 112 in addition to the CPU 101, the RAM 102, the ROM 103, and the HDD 104.

The operation unit I/F 105 is mutually connected to an operation unit 106. The operation unit 106 includes a display device such as a touch panel that notifies a user of a state of the image forming apparatus and receives an operation from the user and a device. The operation unit 106 further includes devices for operating the image forming apparatus, such as an operation button for issuing an instruction to the image forming apparatus.

The device I/F 107 connects a scanner 108 and a printer 109 serving as image input/output devices with the controller unit 100, and inputs and outputs image data. The image data input from the scanner 108 via the device I/F 107 is stored in the RAM 102 and the HDD 104. Image processing processes the image data stored in the RAM 102 and the HDD 104, as needed, using an application program stored in the RAM 102. The image data is output to the printer 109 via the device I/F 107.

The network I/F 110 is connected to a local area network (LAN). The network I/F 110 inputs and outputs image data stored in an external device on the LAN and information for controlling the image forming apparatus. The wireless I/F 112 is an I/F for exchanging data with an external device having another wireless I/F via wireless communication. The type of the wireless I/F includes a wireless LAN, Near Field Communication (NFC), BlueTooth (registered trademark), and infrared communication, but is not limited to these types.

A configuration of the image forming apparatus is not limited to the configuration illustrated in FIG. 1, but a configuration not illustrated in FIG. 1 is usable if an effect of the present invention is satisfied. In an image forming apparatus having a facsimile (FAX) function, for example, a controller unit 100 includes an I/F directed to a modem device. The controller unit 100 is connected to a public line via a modem, and transmits information via a FAX. To read out and print data stored in a flash memory card, the controller unit 100 may include a Universal Serial Bus (USB) I/F (not illustrated).

Figure 2:
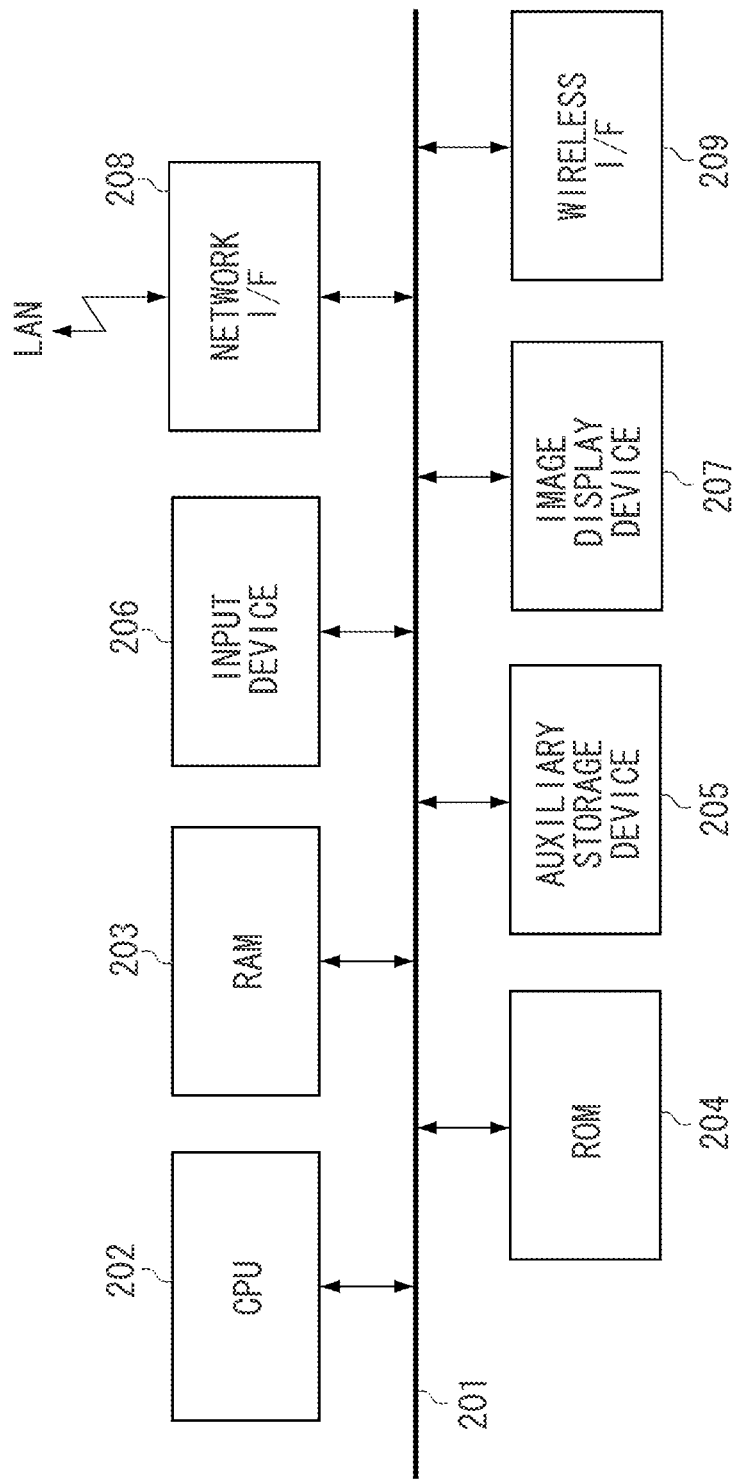
FIG. 2 illustrates a hardware configuration of an information processing apparatus.

FIG. 2 illustrates an example of a hardware configuration of the information processing apparatus. In the present exemplary embodiment, FIG. 2 illustrates an example of an internal configuration of a client personal computer (PC) 302 and a mobile terminal 303 illustrated in FIG. 3, described below.

A CPU 202 performs information processing, as described below. A RAM 203 provides a work area for the CPU 202. A ROM 204 stores a boot program and an application program. An auxiliary storage device 205 provides a control program according to the present exemplary embodiment. The auxiliary storage device 205 includes a hard disk, a flash memory, a floppy (registered trademark) disk, and a compact disk read-only memory (CD-ROM).

An image display device 207 is a device used for the purpose of notifying a user of a message. The image display device 207 includes a cathode ray tube (CRT) display and a liquid crystal display. Input (operation) is entered through an input device 206 by the user. The input device 206 includes at least one of an operation panel, a mouse, and a keyboard.

A network I/F 208 is an I/F for mutually exchanging data with the external device via the LAN. A wireless I/F 209 is an I/F for mutually exchanging data with the external device provided with another wireless I/F. The type of the wireless I/F includes a wireless LAN, Near Field Communication (NFC), BlueTooth (registered trademark), and infrared communication, but is not limited to these types. A main bus 201 is used for connecting the above-mentioned devices in the information processing apparatus to be communicable with one another.

Figure 3:
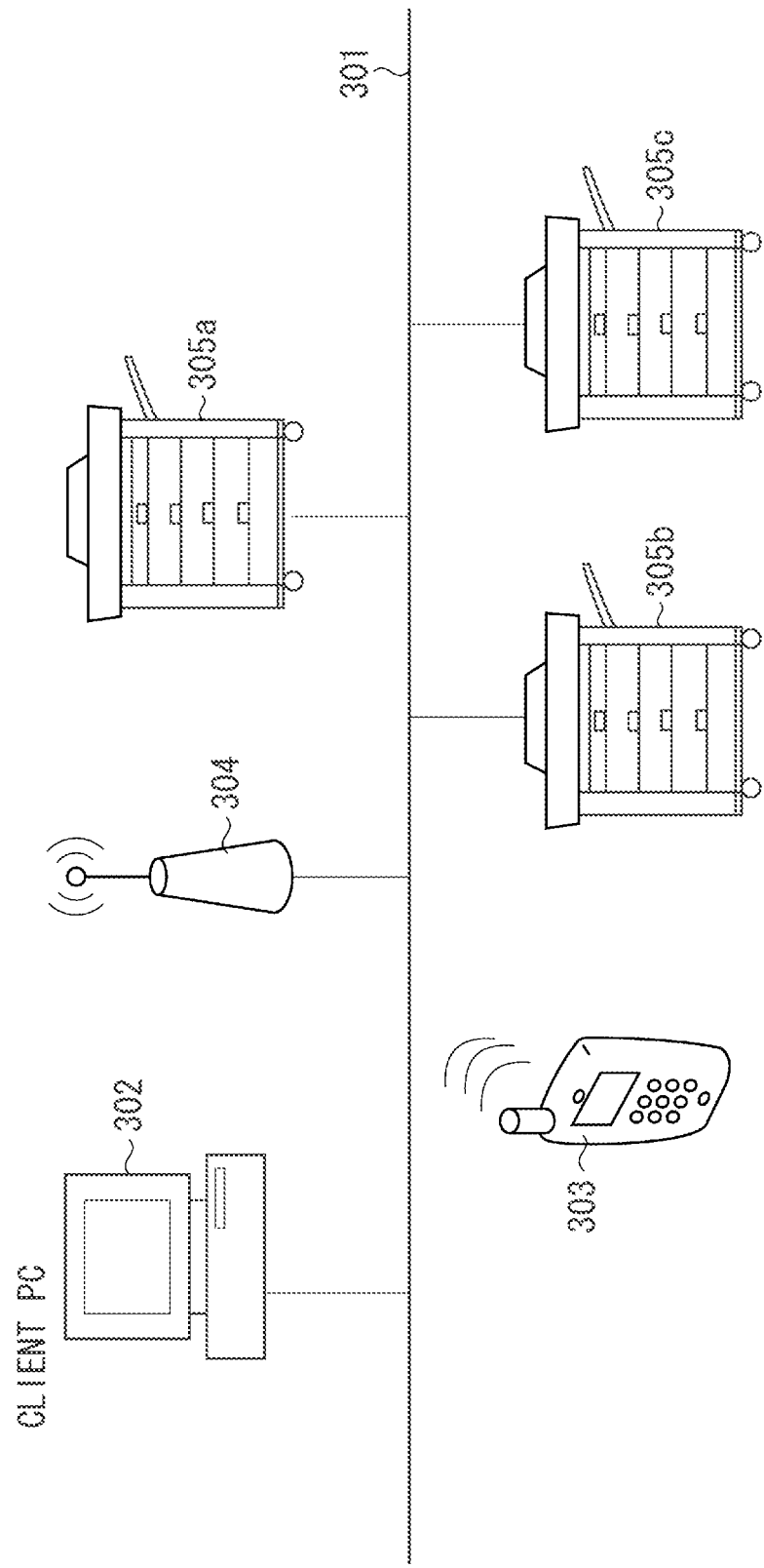
FIG. 3 illustrates a configuration of an image processing system.

FIG. 3 illustrates an example of a configuration of an image processing system according to the present exemplary embodiment. In the present exemplary embodiment, a case where the user uses the image forming apparatus provided with the information terminal will be described as an example.

The client PC 302, an access point 304, and image forming apparatuses 305a, 305b, and 305c are connected to a LAN 301. The mobile terminal 303 is one type of the information terminal that communicates with the image forming apparatuses 305a, 305b, and 305c. A communication means between the mobile terminal 303 and the image forming apparatuses 305a, 305b, and 305c is not particularly restricted.

For example, a method in which the mobile terminal 303 communicates with the image forming apparatuses 305a, 305b, and 305c by connecting to the LAN 301 via the access point 304, can be adopted. A method in which the mobile terminal 303 directly communicates with the image forming apparatuses 305a, 305b, and 305c using wireless I/Fs 112 in the image forming apparatuses 305a, 305b, and 305c may also be adopted. Further, a method in which the mobile terminal 303 uses the wireless I/Fs 112 in the image forming apparatuses 305a, 305b, and 305c to acquire an Internet Protocol (IP) address of the image forming apparatus and communicates with the image forming apparatus via the access point 304 using the IP address can also be adopted. In such a case, a plurality of I/Fs is concurrently used.

An example of a user operation will be described below by taking a function of sending scan data to a designated address (this function is referred to as a send function, as needed, in the following description). The send function is executed in the following settings (I), (II), and (III), for example (contents of the execution are referred to as "Send 1", as needed, in the following description).

(I) Send scan data to three specific addresses with the scan data attached to a mail.

(II) A file format is Extensible Markup Language (XML) Paper Specification (XPS), and the resolution of the scan data is 300 dpi.

(III) A scanned document is a two-sided document.

If the user instructs the image forming apparatuses 305a, 305b, and 305c to perform an operation of "Send 1" using the operation unit 106, the following operation is performed as an example.

—User Operation of Image Forming Apparatus 305a When "Send 1" is Executed—

In the image forming apparatus 305a, addresses 1 to 3 are registered in an address book, a default setting of a surface to be scanned is "one-sided", a default setting of the file format is Portable Document Format (PDF), and a default setting of the resolution of the scan data is 300 dpi. A1, A2, A3, A4, A5, A6, A7, A8, and A9 are operated in this order. A2 to A8 are operated in random order.

(Send 1—A1) Open a screen of the send function.
(Send 1—A2) Select the address 1 from the address book.
(Send 1—A3) Select the address 2 from the address book.
(Send 1—A4) Select the address 3 from the address book.
(Send 1—A5) Set the surface to be scanned to "two-sided" because the default setting of the surface to be scanned is "one-sided" in the image forming apparatus 305a.
(Send 1—A6) Designate XPS as the file format because the default setting of the file format is PDF in the image forming apparatus 305a.
(Send 1—A7) The resolution of the scan data is is unchanged because the default setting of the resolution is "300 dpi" in the image forming apparatus 305a.
(Send 1—A8) Place the document on a scanner.
(Send 1—A9) Press a start key.

—User Operation of Image Forming Apparatus 305b When "Send 1" is Executed—

In the image forming apparatus 305b, addresses 1 to 3 are not registered in an address book, a default setting of a surface to be scanned is "two-sided", a default setting of a file format is XPS, and a default setting of the resolution of scan data is 300 dpi. B1, B2, B3, B4, B5, B6, B7, B8, and B9 are operated in this order. B2 to B8 are operated in random order.

(Send 1—B1) Open a screen of the send function.
(Send 1—B2) Operate the operation unit 106 and input the address 1 because the address 1 is not registered in the address book.
(Send 1—B3) Operate the operation unit 106 and input the address 2 because the address 2 is not registered in the address book.
(Send 1—B4) Operate the operation unit 106 and input the address 3 because the address 3 is not registered in the address book.
(Send 1—B5) The surface to be scanned is unchanged because the default setting of the surface to be scanned is "two-sided" in the image forming apparatus 305b.
(Send 1—B6) The file format is is unchanged because the default setting of the file format is XPS in the image forming apparatus 305b.
(Send 1—B7) The resolution of the scan data is is unchanged because the default setting of the resolution is "300 dpi" in the image forming apparatus 305b.
(Send 1—B8) Place the document on a scanner.
(Send 1—B9) Press a start key.

—User Operation of Image Forming Apparatus 305c When "Send 1" is Executed—

In the image forming apparatus 305c, addresses 1 to 3 are not registered in an address book, a default setting of a surface to be scanned is "one-sided", and a default setting of the resolution of scan data is "300 dpi". The image forming apparatus 305c has no capability to generate a file with an XPS format. C1, C2, C3, C4, C5, C6, C7, C8, and C9 are operated in this order. C2 to C8 are operated in random order.

(Send 1—C1) Open a screen of the send function.
(Send 1—C2) Operate the operation unit 106 and input the address 1 because the address 1 is not registered in the address book.
(Send 1—C3) Operate the operation unit 106 and input the address 2 because the address 2 is not registered in the address book.
(Send 1—C4) Operate the operation unit 106 and input the address 3 because the address 3 is not registered in the address book.
(Send 1—C5) Set the surface to be scanned to "two-sided" because the default setting of the surface to be scanned is "one-sided" in the image forming apparatus 305c.
(Send 1—C6) Designate PDF as a file format because the image forming apparatus 305c has no capability to generate a file with an XPS format.
(Send 1—C7) The resolution of the scan data is is unchanged because the default setting of the resolution is "300 dpi" in the image forming apparatus 305c.
(Send 1—C8) Place the document on a scanner.
(Send 1—C9) Press a start key.

If the default settings related to "Send 1" in the image forming apparatuses 305a, 305b, and 305c and the capabilities thereof are not thus the same, an operation performed by the user differs for each of the image forming apparatuses 305a, 305b, and 305c.

An example of a user operation in the image forming apparatus 305a will be described below in a case where setting information required when the image forming apparatus 305a issues an instruction to execute "Send 1", is retained as preset data in a nonvolatile area (e.g., the HDD 104). Data designating a content of an operation for a specific function (data representing a content of a setting required to execute the function) is hereinafter referred to as setting information. The user can execute "Send 1" by the following operation.

—User Operation Using Preset Data of "Send 1"—

(Send 1—D1) Place the document on a scanner.
(Send 1—D2) Perform an operation necessary for calling and executing the preset data of "Send 1".

When the preset data of "Send 1" has not been set in the image forming apparatus 305b, if "Send 1" is executed using the image forming apparatus 305b, the above-mentioned operations (Send 1—B1) to (Send 1—B9) need to be performed. Thus, the necessary required operation performed by the user for the image forming apparatus 305b greatly changes depending on a setting situation of the preset data.

An example of a user operation using the information terminal and the image forming apparatus according to the present exemplary embodiment will be described below.

Here, an operation for storing setting information (preset data) necessary for issuing an instruction to execute "Send 1" in the auxiliary storage device 205 (a storage area such as a flash memory) in the mobile terminal 303 is performed.

For example, the mobile terminal 303 receives preset data stored in a nonvolatile storage area in the image forming apparatus via the network I/F 110 in the image forming apparatus, and the network I/F 208 in the mobile terminal 303, and stores the preset data in the auxiliary storage device 205. Alternatively, the network I/Fs 110 and 208 may be respectively replaced with the wireless I/F 112 in the image forming apparatus and the wireless I/F 209 in the mobile terminal 303. Further, the user may optionally generate the preset data using the program stored in the ROM 204 in the mobile terminal 303 and, the image display device 207 and the input device 206. The mobile terminal 303 may receive preset data stored in a nonvolatile storage area in a server (not illustrated) connected to the LAN 301 via the network I/F 208 and the wireless I/F 209, and store the received preset data in the auxiliary storage device 205.

Thus, the user operates the mobile terminal 303, to send the setting information (preset data), which is stored in the storage area such as the flash memory serving as the auxiliary storage device 205, to the image forming apparatus. The image forming apparatus, which has received the setting information, is caused to operate the apparatus according to the setting information. An example of the user operation at this time is as follows.

—User Operation when "Send 1" for Image Forming Apparatus is Executed Using Mobile Terminal 303—
  (Send 1—E1) Place the document on a scanner.
  (Send 1—E2) Send setting information of "Send 1" to the image forming apparatus from the mobile terminal 303.

The content of the setting of "Send 1" is designated in the setting information. Thus, the user need not consider the setting of a default value for the image forming apparatus when issuing an instruction to execute "Send 1". Preset data in the image forming apparatus has not been used. Thus, the user operation is not affected by a setting condition of the preset data. Further, in the above-mentioned example, the image forming apparatus 305c cannot generate a file in an XPS format. In such a case, in the present exemplary embodiment, the image forming apparatus 305c performs processing for correcting the received setting information, to reduce the influence on the user operation. More specifically, in the above-mentioned example, the image forming apparatus 305c corrects the designation of the file format to be generated, from XPS to PDF. At this time, a file format different from the setting information is designated. Thus, "Send 1" may be executed after confirmation is obtained from the user. Therefore, the setting information retained by the mobile terminal 303 need not be changed in consideration of a difference in the capability and the default setting among the image forming apparatuses 305a, 305b, and 305c. More specifically, the user can issue an instruction for executing "Send 1" to the image forming apparatuses 305a, 305b, and 305c with the same operation performed for the mobile terminal 303.

A case where setting information is sent to the image forming apparatus from the client PC 302 will be described below. In this case, when a user sends an inquiry to a call center of the image forming apparatus, setting information is set to the image forming apparatus from the call censor. If the user inquires of the call center about a complicated setting such as a bookbinding setting of a copy function by phone, the call center conventionally sends information for performing the setting, orally or by mail. On the other hand, in the image processing system according to the present exemplary embodiment, the setting information is sent from the client PC 302 and is directly set to an image forming apparatus of the user so that the user can be accurately and quickly supported. Processing for the setting information in the client PC 302 can be implemented in a similar manner to the processing for the setting information in the mobile terminal 303. Thus, detailed description of the processing for setting the information to the client PC 302 is omitted.

Figure 4:
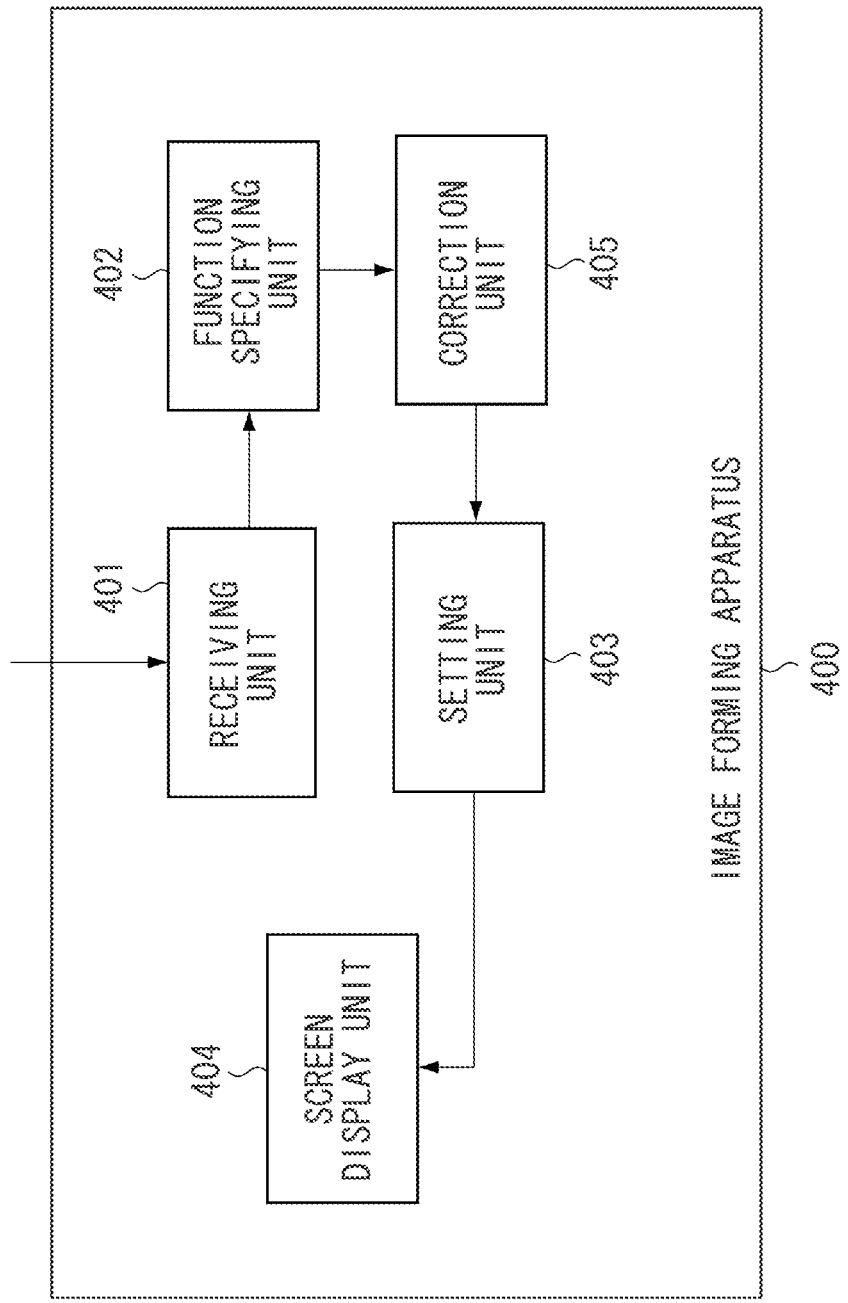
FIG. 4 illustrates a functional configuration of the image forming apparatus.
Figure 5:
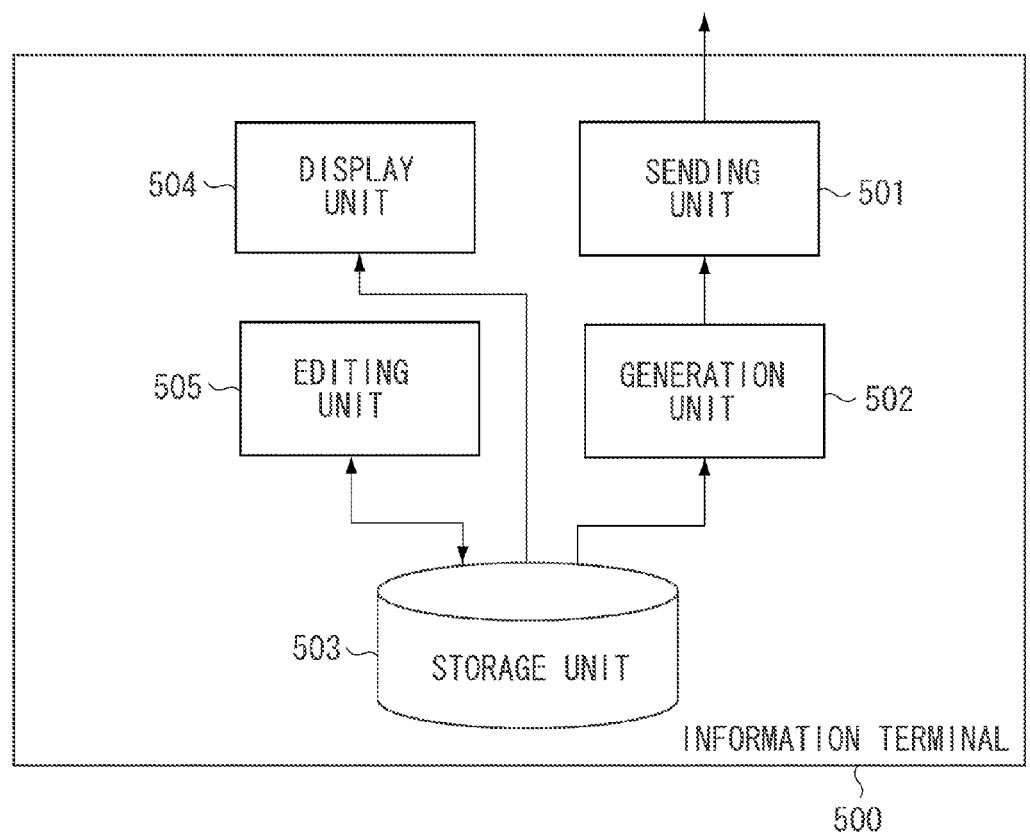
FIG. 5 illustrates a functional configuration of an information terminal.

FIG. 4 illustrates an example of a functional configuration of an image forming apparatus 400. The image forming apparatus 305a, 305b, and 305c are generically referred to as the image forming apparatus 400. FIG. 5 illustrates an example of a functional configuration of an information terminal 500. The client PC 302 and the mobile terminal 303 are generically referred to as the information terminal 500. The CPU 101 executes programs 401, 402, 403, 404, and 405 for controlling the image forming apparatus 400. The CPU 202 executes programs 501, 502, 503, and 504 for controlling the information terminal 500. An example of an operation for controlling the image forming apparatus 400 from the information terminal 500 will be described with reference to FIGS. 4 and 5.

An example of an operation of the mobile terminal 303 (the information terminal 500) will be first described.

In the mobile terminal 303, the storage unit 503 stores one or more elements respectively corresponding to setting items in the image forming apparatus 400. The elements will be described below. Setting information includes one or more elements. In the mobile terminal 303, the display unit 504 displays the setting information to the user. The editing unit 505 edits the setting information displayed by the display unit 504. The editing unit 505 can attach control information for correction processing performed when there is a setting that cannot be implemented in the image forming apparatus 400, to the setting information to be sent to the mobile terminal 303 and edit the setting information such as a sending destination and a color mode.

When the user selects one or more setting information using the input device 206, the storage unit 503 outputs all elements included in the selected setting information to the generation unit 502. The generation unit 502 generates the setting information to be sent to the image forming apparatus 400 based on the element input from the storage unit 503. Then, the user issues an instruction to send the setting information to the specific image forming apparatus 400 using the input device 206. A method for designating the image forming apparatus 400 is not limited. For example, the image forming apparatus 400 can be specified using a method for making the mobile terminal 303 have an IP address of the image forming apparatus 400 or establishing a communication channel with the specific image forming apparatus 400 using NFC. In the present embodiment, a case where the specified image forming apparatus 400 is the image forming apparatus 305a will be described as an example. When the instruction to send the setting information is received from the user, the sending unit 501 sends the generated setting information to the specified image forming apparatus 305a.

An example of an operation of the image forming apparatus 400 will be described below. As described above, the operation of the image forming apparatus 400 will be described by taking the image forming apparatus 305a as an example.

The receiving unit 401 in the image forming apparatus 305a receives setting information sent from the mobile terminal 303. The receiving unit 401 outputs the setting information to the function specifying unit 402.

The function specifying unit 402 specifies a function to be executed, from the setting information input from the receiving unit 401. The correction unit 405 analyzes the setting information based on a capability and a state of the image forming apparatus 305a, and determines whether the setting information includes an element that cannot be set by the image forming apparatus 305a when the specified function is executed. As a result of the determination, when the setting information includes the element that cannot be set in the image forming apparatus 305a, the correction unit 405 changes the element to an element that can be set by the image forming apparatus 305a. After the above-mentioned analysis and change of the element are finished, the setting unit 403 sets the function and designates the operation based on the setting information.

FIG. 6A illustrates a first example of setting information 600 of "Send 1".

A row 601 is a start tag, and represents the start of the setting information 600 of "Send 1".

Rows 602 to 606 are respectively items and their values. The items and the values are elements. Details of each element will be described below.

The row 602 indicates that a target function of the setting information 600 is a send function.

The row 603 represents three address information. In the example illustrated in FIG. 6A, ginji@xxx.co.jp, buntaro@xxx.co.jp, and goemon@xxx.co.jp are respectively designated as the three address information.

The row 604 indicates that a format of a file to be generated is designated as XPS.

The row 605 indicates that the resolution of scan data is designated as 300 dpi.

The row 606 indicates that a document is scanned on both sides.

The row 607 is a setting which causes the apparatus to perform immediately execution without waiting for an instruction from the user to start the execution from the operation unit 106 after a setting based on the setting information 600 is completed.

The row 608 is an end tag, and represents the end of the setting information of "Send 1".

FIG. 6B illustrates a first example of setting information 610 of a box function for storing a file in the image forming apparatus 400. In the following description, a content of the setting information 610 is referred to as "Box 1", as needed.

Rows 611 and 615 respectively have meanings similar to those of the rows 601 and 608 illustrated in FIG. 6A, and hence detailed description thereof is not repeated. The rows 612 to 614 are elements of the setting information 610 of "Box 1". Details of each of the elements will be described below.

The row 612 indicates that a target function of the setting information 610 is a box function.

The row 613 indicates that a content of execution is designated to be display of a target folder (folder movement display). When there is such a description, a screen for designating a storage folder (see FIG. 14A, described below) is displayed.

The row 614 represents a location of the folder to be displayed.

FIG. 6C illustrates a second example of setting information 620 of a box function. In the following description, a content of the setting information 620 is referred to as "Box 2", as needed.

Rows 621 and 626 have meanings similar to the rows 601 and 608 illustrated in FIG. 6A, and hence detailed description thereof is not repeated. The rows 622 to 625 are elements of the setting information 620 of "Box 2". Details of each of the elements will be described below.

The rows 622 and 624 have meanings similar to the rows 612 and 614 illustrated in FIG. 6B, and hence detailed description thereof is not repeated.

The row 623 indicates that an execution content is designated to be an operation for scanning a document and storing data representing the scanned document in a box. In the following description, this operation is referred to as ScanToBox, as needed. When there is such a description, unlike a case where there is a description like the row 613, a screen for designating a storage folder (see FIG. 14A, described below) is not displayed but a screen for performing a setting related to scanning (see FIG. 14B, described below) is displayed.

A description of the row 625 indicates that a document is scanned on both sides.

Figure 6D:
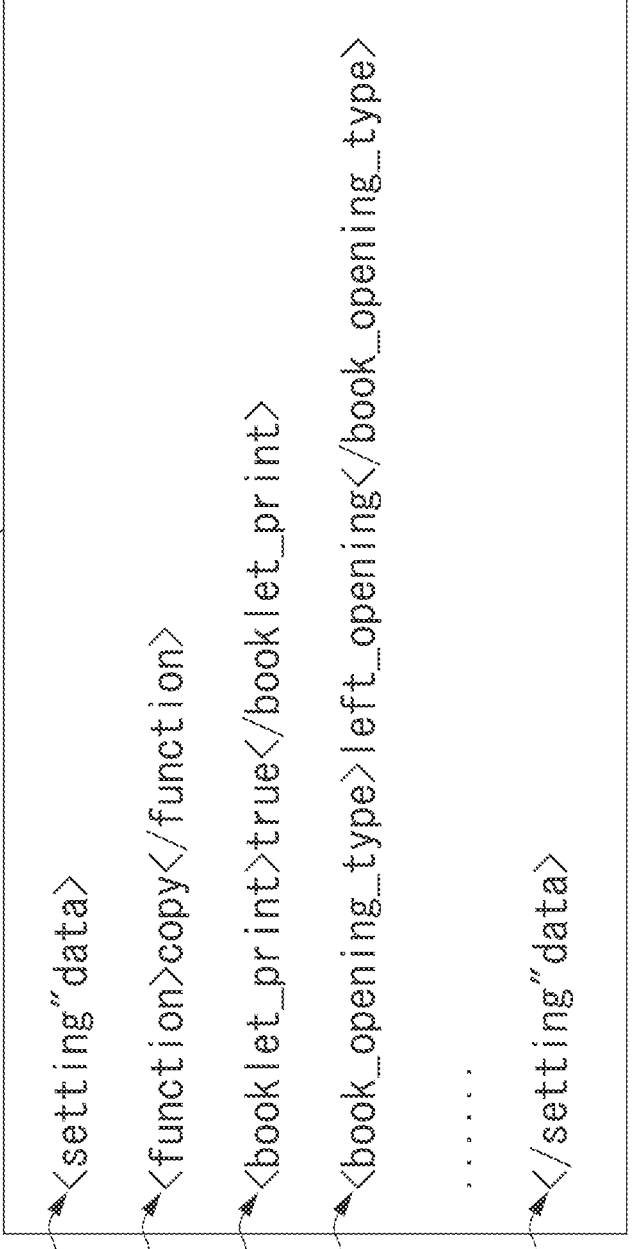
FIG. 6D illustrates a fourth example of setting information.

FIG. 6D illustrates an example of setting information 630 of a copy function. In the following description, a content of the setting information 630 is referred to as "Copy 1".

Rows 631 and 635 respectively have a meaning similar to those of the rows 601 and 608 illustrated in FIG. 6A, and hence detailed description thereof is not repeated.

The rows 632 to 634 are elements of the setting information 630 of "Copy 1". Details of each element will be described below.

The row 632 indicates that a target function of the setting information 630 is a copy function.

The row 633 indicates that a setting of a bookbinding print is ON.

The row 634 indicates that a method for opening the bookbinding print is set to "leftward-opening".

FIG. 6E illustrates a second example of setting information 640 of "Send 1".

Rows 641 to 648 respectively have a meaning similar to those of the rows 601 to 608 illustrated in FIG. 6A, and hence detailed description thereof is not repeated.

The rows 649 and 650 respectively represent control methods during correction processing. The row 649 indicates that execution of "Send 1" is stopped when a file cannot be generated in a format designated on the row 644. The row 650 indicates that a confirmation screen is displayed when the resolution of scan data to be generated cannot be set to a resolution designated on the row 645.

FIG. 7 is a flowchart illustrating an example of the outline of operations in the image forming apparatus 400 and the information terminal 500.

If the information terminal 500 receives from a user an instruction to select and send setting information, then in step S721, the generation unit 502 generates setting information.

In step S711, the receiving unit 401 in the image forming apparatus 400 establishes a communication channel with the information terminal 500. In step S722, the sending unit 501 in the information terminal 500 establishes a communication channel with the image forming apparatus 400. The establishment of the communication channel is performed according to a content of a communication protocol such as Transmission Control Protocol/Internet Protocol (TCP/IP), NFC, or BlueTooth (registered trademark), for example. The establishment of the communication channel can be implemented using a known technique. Thus, a communication channel between the image forming apparatus 400 and the information terminal 500 is established.

In step S723, the sending unit 501 in the information terminal 500 sends the setting information, which has been generated in step S721, to the image forming apparatus 400 using the established communication channel. In step S712, the receiving unit 401 in the image forming apparatus 400 waits until it receives the setting information. If the receiving unit 401 in the image forming apparatus 400 receives the setting information (YES in step S712), then in step S713, the receiving unit 401 terminates the communication channel that has been established in step S711. Further, in step S724, the sending unit 501 in the information terminal 500 terminates the communication channel that has been established in step S722. Then, the information terminal 500 terminates the processing. On the other hand, in step S714, the image forming apparatus 400 performs setting/execution processing according to the setting information, which has been received in step S712, and the processing is ended.

FIG. 8 is a flowchart illustrating in details an example of step S714 (the setting/execution processing) in the image forming apparatus 400.

In step S801, the function specifying unit 402 determines a function designated in the setting information that has been received in step S712.

If the functions designated in the setting information are a copy function, a box function, and a send function as a result of the determination, copy function processing in step S802, box function processing in step S803, and send function processing in step S804 are respectively performed. If the function designated in the setting information is a function other than the copy function, the box function, or the send function, another function processing in step S805 is performed.

When a process in step S802, S803, S804, or S805 ends, the setting/execution processing ends. In the example of the setting information 600 illustrated in FIG. 6A, the send function is designated on the row 602. Thus, if the setting information 600 have been received, the processing proceeds to step S804. Similarly, the processing proceeds steps S803 if the setting information 610 and 620 have been received. The processing proceeds to steps S802 if the setting information 630 has been received, and proceeds to steps S804 if the setting information 640 has been received.

Figure 9:
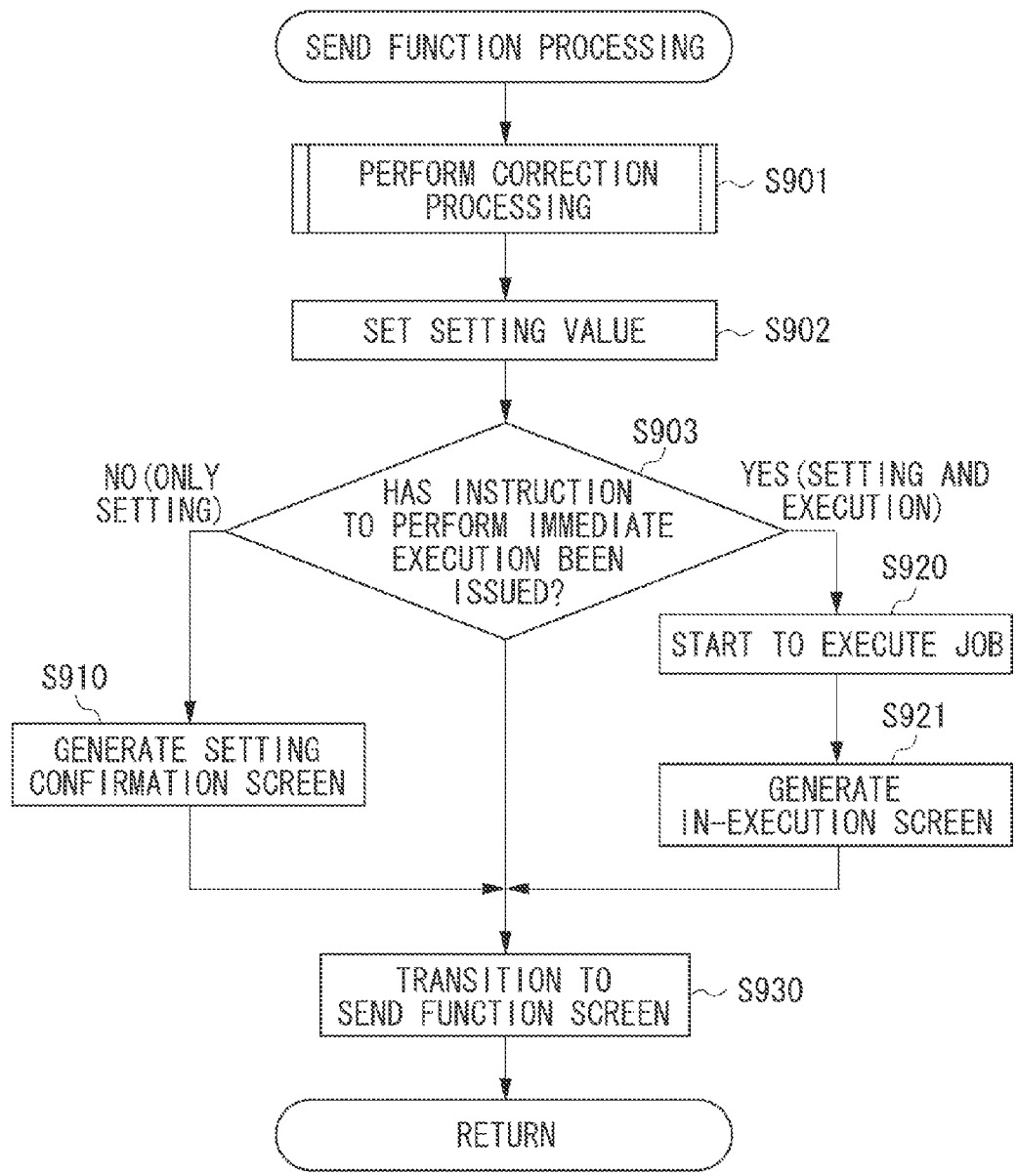
FIG. 9 is a flowchart illustrating details of step S804.

FIG. 9 is a flowchart illustrating an example of details of step S804 (the send function processing) illustrated in FIG. 8.

In step S901, the correction unit 405 performs correction processing.

In step S902, the setting unit 403 sets a setting value according to the setting information of the send function. If the setting information 600 illustrated in FIG. 6A is received, the setting unit 403 sets three values, ginji@xxx.co.jp, buntaro@xxx.co.jp, and goemon@xxx.co.jp as setting values of addresses. The setting unit 403 sets XPS as a setting value of a file format to be generated while setting a resolution to 300 dpi as a setting value.

In step S903, the setting unit 403 determines whether an instruction to perform immediate execution has been issued in the setting information. If the instruction to perform immediate execution has been issued in the setting information as a result of the determination (YES in step S903), the processing proceeds to step S920. On the other hand, if the instruction to perform immediate execution has not been issued in the setting information but an instruction to perform only the setting has been issued (NO in step S903), the processing proceeds to step S910. If the setting information 600 illustrated in FIG. 6A has been received, an instruction to perform immediate execution is issued to the row 607, and thus the processing proceeds to step S920.

In step S910, the screen display unit 404 generates a setting confirmation screen for confirming a content that has been set in step S902. When the processing thus proceeds to step S910, the screen display unit 404 starts to execute a job after confirming with the user whether the job can be executed. The processing then proceeds to step S930 as described below.

On the other hand, in step S920, the setting unit 403 starts to execute the job based on the content (setting value) that has been set in step S902. When the processing thus proceeds to step S920, the setting unit 403 starts to execute the job without confirming with the user whether the job can be executed. In step S921, the screen display unit 404 generates an in-execution screen for displaying an execution condition of the job. The processing then proceeds to step S930.

In step S930, the screen display unit 404 makes a transition of a screen displayed on the operation unit 106 to a send function screen. More specifically, whichever screen has been displayed on the operation unit 106, the display of the operation unit 106 is switched to the screen that has been generated in step S910 or S921.

The copy function processing in step S802 illustrated in FIG. 8 can be implemented by replacing the send function processing with the copy function processing in each step illustrated in FIG. 9. Therefore, as for the copy function processing, illustration of a flowchart and detailed description thereof are not repeated.

Figure 10:
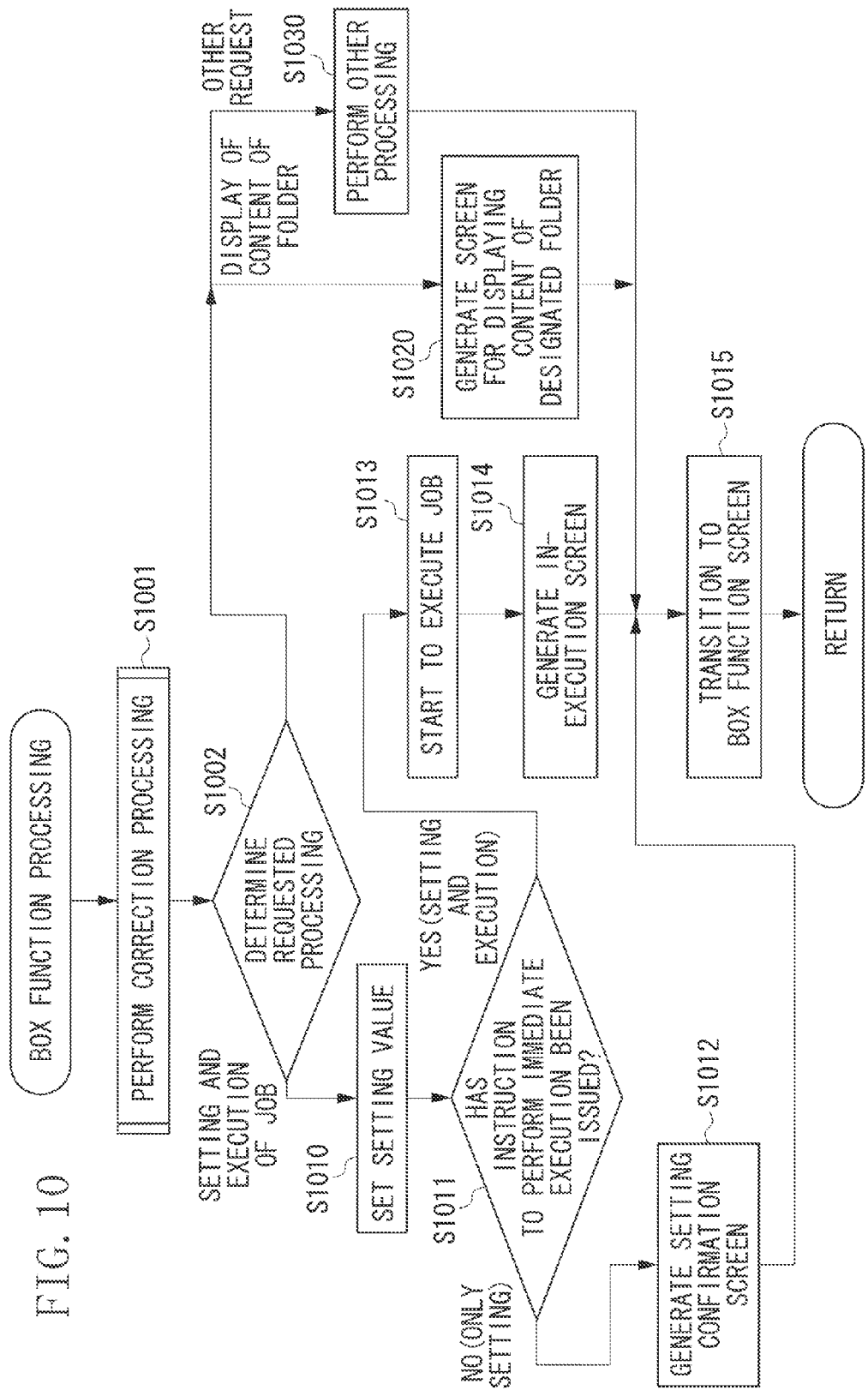
FIG. 10 is a flowchart illustrating details of step S803.

FIG. 10 is a flowchart illustrating in details an example of step S803 (the box function processing) illustrated in FIG. 8.

In step S1001, the correction unit 405 performs correction processing.

In step S1002, the setting unit 403 determines a content of processing requested by the setting information of the box function. If the requested processing is setting and execution of a job as a result of the determination, the processing proceeds to step S1010. If the requested processing is display of a content of a folder in a box, the processing proceeds to step S1020. If the requested processing is another request, the processing proceeds to step S1030. Processes in steps S1010 to S1014 are similar to processes in step S902 and the subsequent steps illustrated in FIG. 9, and hence detailed description thereof is not repeated.

In step S1020, the screen display unit 404 generates a screen on which the content of the designated folder is displayed. In step S1030, another processing is performed. In another processing, a screen corresponding to the requested processing is generated. After steps S1012, S1014, S1020, and S1030 end, the processing proceeds to step S1015. In step S1015, the screen display unit 404 makes a transition of the screen displayed on the operation unit 106 to a box function screen. More specifically, whichever screen has been displayed on the operation unit 106, the display on the operation unit 106 is switched to the screens that have been generated in steps S1012, S1014, S1020, and S1030.

The image forming apparatus 400 according to the present exemplary embodiment displays a screen having display items and values corresponding to a function requested in the setting information received from the information terminal 500 and a content of processing based on the function on the operation unit 106, as described with reference to FIGS. 9 and 10.

Figure 11:
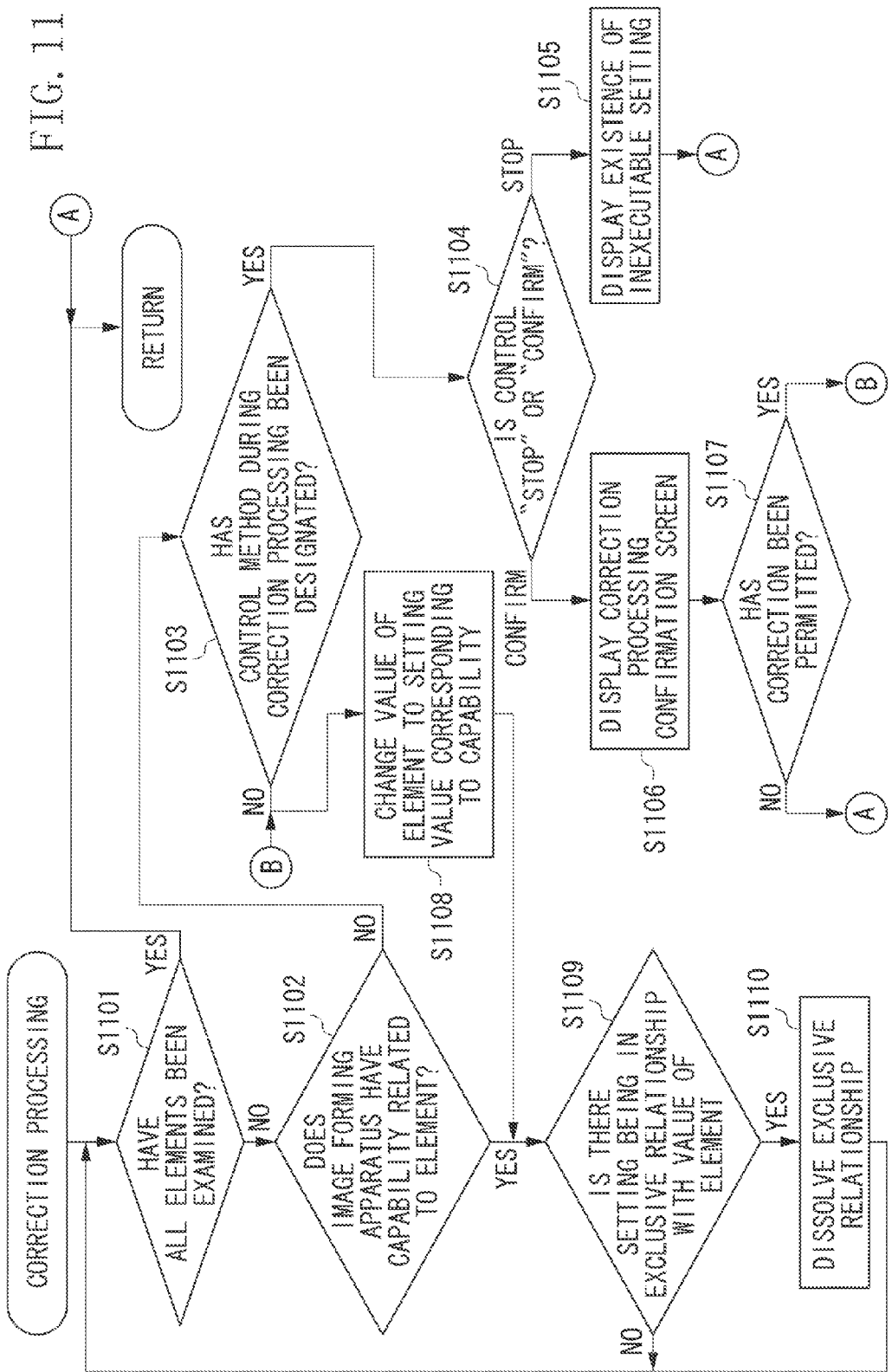
FIG. 11 is a flowchart illustrating details of steps S901 and S1001.

FIG. 11 is a flowchart illustrating in details an example of the correction processing in step S901 illustrated in FIG. 9 and step S1001 illustrated in FIG. 10.

In step S1101, the correction unit 405 determines whether all elements of the setting information, which has been received in step S712 illustrated in FIG. 7, have been examined. If all the elements of the setting information have been examined as a result of the determination (YES in step S1101), the processing in the flowchart illustrated in FIG. 11 ends.

On the other hand, if all the elements of the setting information have not been examined (NO in step S1101), the processing proceeds to step S1102. In step S1102, the correction unit 405 determines whether the image forming apparatus 400 has a capability related to the target element. If the image forming apparatus 400 has the capability related to the element as a result of the determination (YES in step S1102), the processing proceeds to step S1109, described below.

On the other hand, if the image forming apparatus 400 does not have the capability related to the element (NO in step S1102), the processing proceeds to step S1103. In step S1103, the correction unit 405 determines whether a control method during correction processing has been designated in the setting information that has been received in step S712. If the control method during the correction processing has not been designated in the setting information as a result of the determination (NO in step S1103), the processing proceeds to step S1108. In step S1108, the correction unit 405 changes a value of the element to a setting value corresponding to the capability of the image forming apparatus 400. For example, the image forming apparatus 400 having no capability of generating a file in an XPS format has received the setting information 600 illustrated in FIG. 6A. In this case, the control method during the correction processing has not been designated in the setting information 600. Thus, the correction unit 405 changes a value of the element on the row 604 to pdf. The processing then proceeds to step S1109, described below.

On the other hand, if it is determined that the control method during the correction processing has been designated in the setting information (YES in step S1103), the processing proceeds to step S1104. In step S1104, the correction unit 405 determines whether the control during the correction processing, which has been designated in the setting information, is "stop" or "confirm".

If the control during the correction processing is "stop", when an inexecutable setting exists, the execution of the setting is stopped. For example, the image forming apparatus 400 having no capability of generating data showing a resolution of 300 dpi or more receives the setting information 640 illustrated in FIG. 6E. In this case, in step S1105, the screen display unit 404 displays on the operation unit 106 the existence of the inexecutable setting and the processing in the flowchart illustrated in FIG. 11 is not repeated. In this case, the processes in step S902 and the subsequent steps illustrated in FIG. 9 and processes in step S1002 and the subsequent steps illustrated in FIG. 10 are not performed.

On the other hand, if the control during the correction processing is "confirm", the processing proceeds to step S1106. In step S1106, the screen display unit 404 displays on the operation unit 106 a correction processing confirmation screen to prompt the user to select whether to permit correction. For example, the image forming apparatus 400 having no capability to generate a file with an XPS format receives the setting information 640 illustrated in FIG. 6E. In this case, in step S1106, the screen display unit 404 displays a correction processing confirmation screen to prompt the user to select whether to change a file format to pdf. On the correction processing confirmation screen, the user may select one of candidates to a setting that can be executed by the image forming apparatus 400.

In step S1107, the setting unit 403 determines whether the correction has been permitted by a user operation on the correction processing confirmation screen. If the correction has been permitted as a result of the determination (YES in step S1107), the processing proceeds to step S1108. In step S1108, the correction unit 405 changes the value of the element to a setting value corresponding to the capability. The processing then proceeds to step S1109, described below.

On the other hand, if the correction has not been permitted (NO in step S1107), the processing in the flowchart illustrated in FIG. 11 ends. In this case, the processes in step S902 and the subsequent steps illustrated in FIG. 9 and the processes in step S1002 and the subsequent steps illustrated in FIG. 10 are not performed.

In step S1109, the correction unit 405 determines whether there is a setting in an exclusive relationship with the value of the target element. If there is no setting which is in an exclusive relationship with the value of the target element as a result of the determination (NO in step S1109), the processing returns to step S1101. In step S1101, the correction unit 405 determines whether there is an element that has not yet been examined. On the other hand, if there is a setting which is in an exclusive relationship with the value of the target element (YES in step S1109), the processing proceeds to step S1110. In step S1110, the correction unit 405 performs processing for cancelling the exclusive relationship.

An example of processing for cancelling the exclusive relationship will be described by taking the setting information 630 illustrated in FIG. 6D as an example. In the image forming apparatus 400, a bookbinding setting and a copy-forgery-inhibited pattern setting are in an exclusive relationship. In the image forming apparatus 400, "forced copy-forgery-inhibited pattern setting" for forcedly printing a copy-forgery-inhibited pattern on a print target page has been set.

The setting information 630 includes an element of the bookbinding setting on the row 633. More specifically, the image forming apparatus 400, which has received the setting information 630, receives setting information which is in an exclusive relationship therewith. In such a case, the correction unit 405 deletes the element of a bookbinding setting in the setting information 630 as well as elements related to the element, to cancel the exclusive relationship. In the example of the setting information 630, the rows 633 and 634 are deleted. When the process in step S1110 ends, the processing returns to step S1101. In step S1101, the correction unit 405 determines whether there is an element that has not yet been examined.

Alternatively, before the processing proceeds from step S1103 to S1108, the correction processing confirmation screen may be displayed on the operation unit 106, similar to step S1106. Only when correction has been permitted by a user operation on the correction processing confirmation screen, the processing may proceed to step S1108. Further, before the processing proceeds from step S1109 to S1110, confirmation by the user may similarly be obtained. More specifically, a screen representing a content of processing for cancelling the exclusive relationship (e.g., deletion of the rows 633 and 634) may be displayed on the operation unit 106, and only when execution of the processing has been permitted by a user operation on the screen, the processing may proceed to step S1110.

While the setting information has been changed as processing for cancelling the exclusive relationship in step S1110, a setting of the image forming apparatus 400 may be changed if its setting can be changed.

The control during the correction processing may be other than "stop" and "confirm" described above. For example, a permission to change the setting by the determination of the image forming apparatus 400 may be used as the control method during the correction processing. In this case, for example, it is determined in step S1103 of FIG. 11 whether the control method during the correction processing shows such a content.

Figure 12:
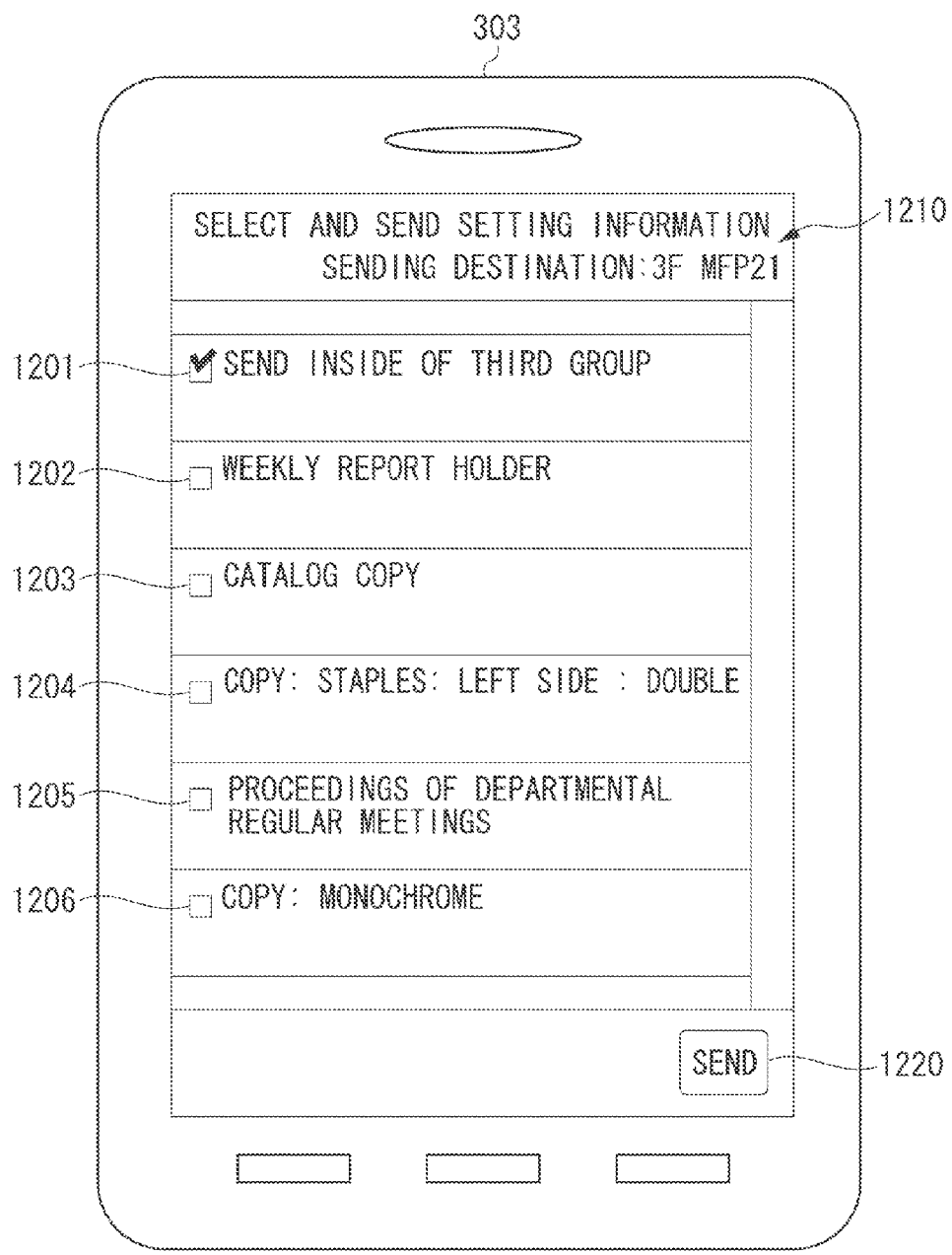
FIG. 12 illustrates a setting information generation screen.

FIG. 12 illustrates an example of a setting information generation screen displayed on the display screen of the mobile terminal 303.

Items 1201 to 1206 represent setting information stored in the mobile terminal 303. In the example illustrated in FIG. 12, the item 1201 has been selected. A sending destination of the setting information is displayed on an area 1210. A button 1220 is used for issuing an instruction to send the setting information. In order to simplify the description, the sending destination is the image forming apparatus 305a. In addition, the items 1201, 1202, 1203, and 1205 are respectively setting information of "Send 1", "Box 1", "Copy 1", and "Box 2".

Figure 13:
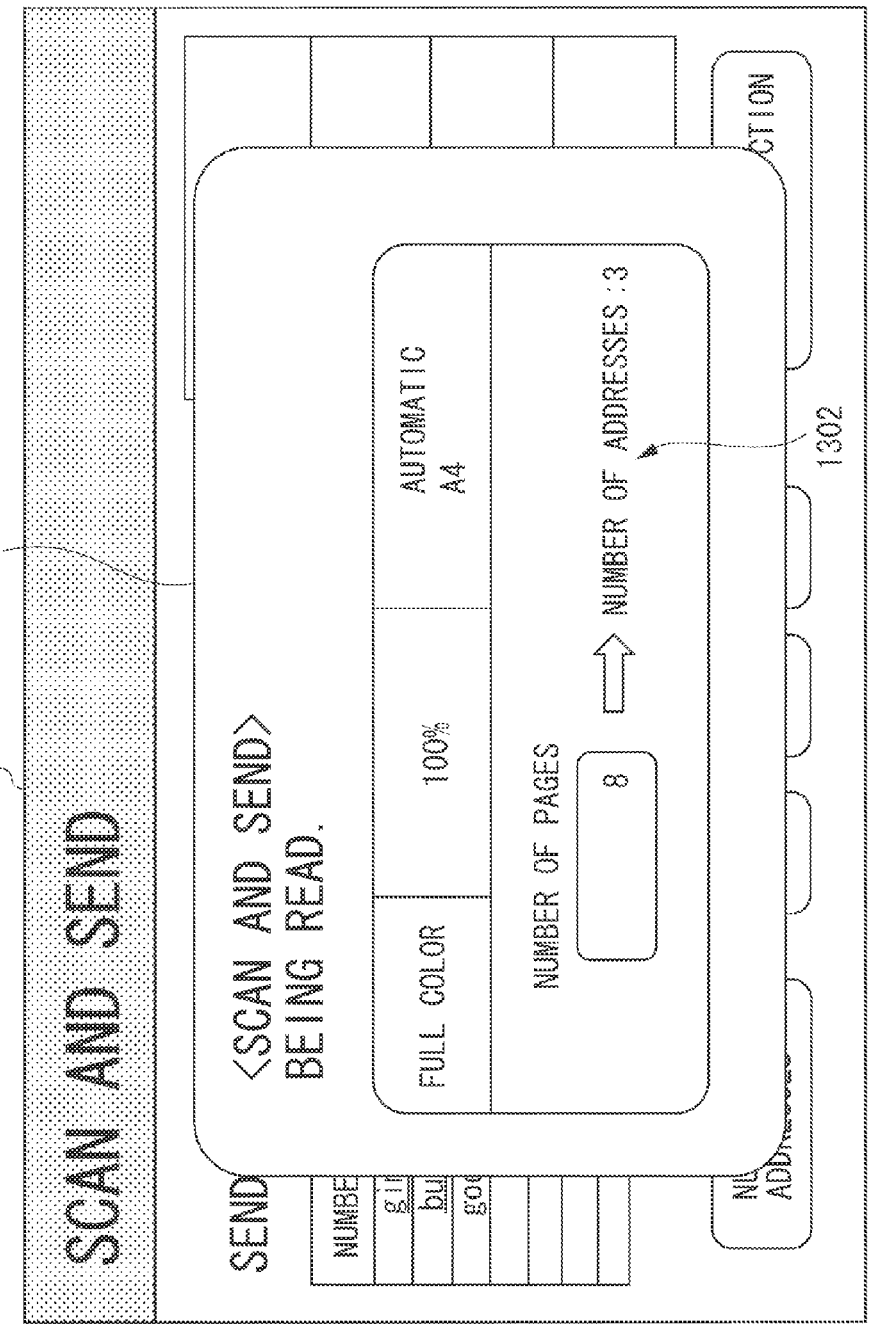
FIG. 13 illustrates a first example of a display screen of an information terminal.
Figure 14A:
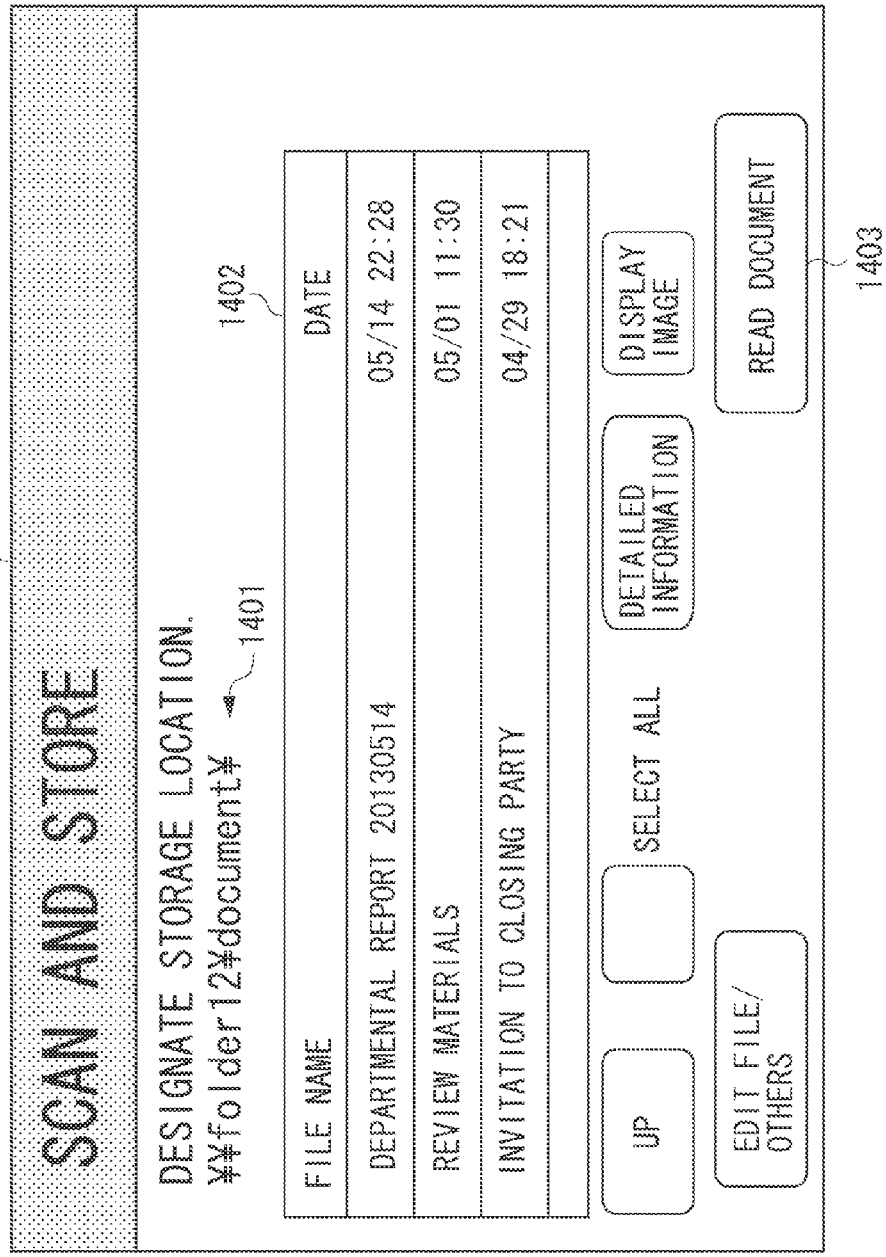

FIGS. 13 and 14 illustrate one example of a screen for receiving setting information from the information terminal 500 by the image forming apparatus 400 and displaying information related to a function that has been designated to be executed in the setting information. FIG. 13 illustrates an example of a screen of a send function. FIGS. 14A and 14B illustrate an example of a screen of a box function.

An example of a user operation in the mobile terminal 303 and transition of a screen in the image forming apparatus 305a will be described below with reference to FIGS. 12, 13, and 14.

A user sets a document in the image forming apparatus 305a, selects the item 1201 in the mobile terminal 303, and presses the button 1220. Consequently, the mobile terminal 303 sends the setting information 600 of "Send 1" to the image forming apparatus 305a.

The image forming apparatus 305a sets the send function based on the setting information 600 received from the mobile terminal 303, and designates the row 607, to start to execute "Send 1" without waiting for a start operation by the user. FIG. 13 illustrates an example of a screen 1300 displayed on the operation unit 106 in the image forming apparatus 305a at that time. A pop-up dialog 1301 indicates that "Send 1" is being executed, and displays a setting during execution and the present number of pages that have already be read. On a display 1302, the total number of addresses designated on the row 603 in the setting information 600 of "Send 1" is displayed. Thus, the row 603 in the setting information 600 of "Send 1" is reflected on the display 1302.

When the user selects the item 1202 illustrated in FIG. 12 and presses the button 1220, the mobile terminal 303 sends the setting information 610 of "Box 1" to the image forming apparatus 305a. The image forming apparatus 305a displays a content of a folder designated on the row 614 on the screen because its control shifts to a ScanToBox function in the box function according to the rows 612 and 613 in the setting information 610 received from the mobile terminal 303. FIG. 14A illustrates an example of a scan screen 1400 displayed on the operation unit 106 in the image forming apparatus 305a in that case. Display 1401 is display of a hierarchical level and a name of the folder designated on the row 614. Thus, the row 614 in the setting information 610 of "Box 1" is reflected on the display 1401. Display 1402 is display of a list of files stored in the folder. When a document reading button 1403 illustrated in FIG. 14A is pressed, a scan screen for performing a setting related to scanning, as illustrated in FIG. 14B, is displayed.

When the user selects the item 1205 illustrated in FIG. 12 and presses the button 1220, the mobile terminal 303 sends the setting information 620 of "Box 2" to the image forming apparatus 305a. The image forming apparatus 305a shifts the display on the operation unit 106 to a scan screen of the ScanToBox function in the box function according to the rows 622 and 623 in the setting information 620 received from the mobile terminal 303. In this case, the scan screen 1400 for designating a storage folder, as illustrated in FIG. 14A, is not displayed, but a scan screen 1410 illustrated in FIG. 14B is displayed.

FIG. 14B illustrates an example of the scan screen 1410 displayed on the operation unit 106 in the image forming apparatus 305a. Display 1411 indicates that a setting of a two-sided document is reflected on ON, as designated on the row 625. A data file scanned on the scan screen 1410 is stored in a folder designated on the row 624. More specifically, the scan screen 1410 need not be displayed via the screen for designating the folder (the scan screen 1400 illustrated in FIG. 14A) like in a normal operation, but is directly displayed.

If scanning is performed in a content set on the scan screen 1410 illustrated in FIG. 14B, the user operates a start key in a hard key group set in the operation unit I/F 105 and the operation unit 106.

As illustrated in FIGS. 6B and 6C, different contents are respectively set as processing contents in the setting information 610 and 620 even though the same box function (see the rows 613 and 623) is performed. Therefore, even in the setting information 610 and 620 of the same box function, there are a case where the scan screen 1410 is displayed after the scan screen 1400 is displayed and a case where the scan screen 1400 is displayed after the scan screen 1410 is displayed according to the processing contents. While a case where the screen that is being displayed is switched to the scan screens 1400 and 1410 has been described as an example in FIGS. 14A and 14B, the scan screens 1400 and 1410 may be displayed on a front surface (forefront surface) of the screen that is being displayed, as illustrated in FIG. 13. The screen 1300 illustrated in FIG. 13 need not be pop-up displayed but may be a screen switched from the screen that is being displayed.

The user can also select a plurality of items illustrated in FIG. 12 and send the selected items to the image forming apparatus 400 (e.g., the image forming apparatus 305a). For example, when the user selects the item 1204 and the item 1206 and presses the button 1220, the generation unit 502 integrates (generates) elements respectively included in the two items 1204 and 1206 as one piece of setting information, and sends the setting information to the image forming apparatus 305a. The image forming apparatus 305a, which has received the setting information, displays on the operation unit 106 a copy function screen including information indicating that a staples setting is made on a left-side and in a double form and a color setting is a monochrome setting.

As described above, in the present exemplary embodiment, the information terminal 500 acquires and stores information about the presetting for the image forming apparatus 400 as setting information. The information terminal 500 sends the setting information selected by the user to the image forming apparatus 400 (without previously send inquiry to the image forming apparatus 400). If the control method during the correction processing is not designated in the setting information and if the image forming apparatus 400 has no capability of executing a function (element) designated in the setting information, the image forming apparatus 400 corrects the setting information to become a setting corresponding to the capability. On the other hand, if the control method during the correction processing is designated in the setting information and if the image forming apparatus 400 has no capability of executing a function (element) designated in the setting information, the image forming apparatus 400 stops the function or corrects the function after confirming the correction, according to the control method.

In the present exemplary embodiment, the image forming apparatus 400 displays a screen for displaying information about a function designated in setting information sent from the information terminal 500 whichever screen has been currently displayed according to the setting information. Further, different screens are displayed even if the same function is designated in the setting information according to a content of the setting information. A screen, which cannot be normally displayed without instructions and settings from the user using a plurality of screens, can be displayed at one time. For example, a scan screen can be normally displayed only after a screen for designating a storage destination of data is displayed. However, when the setting information includes a storage destination of the scan data, the scan screen can be displayed without displaying the screen for designating a storage destination of data.

As described above, in the present exemplary embodiment, as for the image forming apparatus 400 on which presetting has not been performed, an operation for executing a function of the presetting can be performed with an operation feeling that is as close as possible (preferably, a similar operation feeling) to a normal operation. The image forming apparatus 400 can prevent correction processing that is not desired by a user and can perform desired processing using a simple method.

Any of the exemplary embodiments described above is only given specific forms as an example in implementing the present invention, and interpretation of the technical scope of the present invention is not limited to the exemplary embodiments. That is, the present invention can be implemented in various forms without departing from the technical scope or its principal features.

As described above, according to the exemplary embodiments, an image forming apparatus for which presetting has not been performed can be operated with an operation feeling that is as close as possible to an operation of an image forming apparatus on which presetting has been performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-086607 filed Apr. 18, 2014, which is hereby incorporated by reference herein in its entirety.

What is claimed is:

1. An image processing apparatus comprising:
   a processor;
   memory;
   a reading unit configured to read an image on a document and generate image data;
   a sending unit configured to send the image data generated by the reading unit to the outside;
   a receiving unit configured to receive setting information from an external apparatus via a wireless network, the setting information representing a content of a setting which causes the sending unit to execute a send function;
   a determination unit configured to determine whether the send function can be executed by the setting represented in the setting information received by the receiving unit;
   a change unit configured to change, when the determination unit determines that the send function cannot be executed by the setting represented in the setting information, the setting represented in the setting information to a setting in which the image processing apparatus can execute the send function; and
   an execution unit configured to execute the send function by performing the setting based on the setting information,
   wherein the execution unit executes, when the change unit has changed the setting represented in the setting information, the send function based on the changed setting information,
   wherein at least one unit is implemented in part by the processor executing instructions stored in the memory.

2. The image processing apparatus according to claim 1, further comprising a display unit configured to display, when the determination unit determines that the send function cannot be executed by the setting represented in the setting information, a confirmation screen for confirming with a user whether to permit the setting represented in the setting information to change,
   wherein the change unit changes, when an instruction to permit the setting represented in the setting information to change has been issued based on an operation for the confirmation screen, the setting represented in the setting information to a setting in which the send function can be executed.

3. The image processing apparatus according to claim 2, wherein the display unit displays, when the setting information includes information indicating that the confirmation screen for confirming with the user whether to permit the setting represented in the setting information to change is displayed, the confirmation screen.

4. The image processing apparatus according to claim 1, wherein the execution unit executes, when the setting information includes information indicating that the send function is executed without confirmation by a user if the image forming apparatus is ready to execute the send function, the function without confirming with the user whether the send function can be executed.

5. The image processing apparatus according to claim 1, wherein the execution unit does not execute, when the send function cannot be implemented by the setting represented in the setting information, the send function if information indicating that the execution of the send function is stopped is included in the setting information.

6. The image processing apparatus according to claim 1, wherein the external apparatus is a mobile apparatus.

7. A method for controlling an image processing apparatus comprising a processor, a memory, a reading unit configured to read an image on a document and generate image data, and a sending unit configured to send the image data generated by the reading unit to the outside, the method comprising:

receiving setting information from an external apparatus via a wireless network, the setting information representing a content of a setting required to execute a send function by the sending unit;
 determining whether the send function can be executed by the setting represented in the received setting information;
 changing, when it is determined in the determination that the send function cannot be executed by the setting represented in the setting information, the setting represented in the setting information to a setting in which the image processing apparatus can execute the send function; and
 executing the send function based on the setting information;
 wherein the execution includes executing the send function based on the changed setting represented in the setting information when the setting information has been changed in the changing,
 wherein at least one unit is implemented in part by the processor executing instructions stored in the memory.

8. A non-transitory computer readable storage medium storing a program for controlling an image processing apparatus having a reading unit configured to read an image on a document and generate image data, and a sending unit configured to send the image data generated by the reading unit to the outside, the control method comprising:

receiving setting information from an external apparatus via a wireless network, the setting information representing a content of a setting required to execute a send function by the sending unit;
 determining whether the send function can be executed by the setting represented in the received setting information;
 changing, when it is determined in the determination that the send function cannot be executed by the setting represented in the setting information, the setting represented in the setting information to a setting in which the image processing apparatus can execute the send function; and
 executing the send function based on the setting information;
 wherein the execution includes executing the send function based on the changed setting represented in the setting information when the setting information has been changed in the changing.

* * * * *